United States Patent [19]

Rösch et al.

[11] Patent Number: 5,779,116

[45] Date of Patent: Jul. 14, 1998

[54] APPARATUS FOR SECURING A LOAD TO A MOTOR VEHICLE

[75] Inventors: Christoph Rösch; Mark Seer, both of München, Germany

[73] Assignee: HS Products AG, Systemtechnik und Produktmanagement, Krailling, Germany

[21] Appl. No.: 647,512

[22] Filed: May 14, 1996

[30] Foreign Application Priority Data

May 23, 1995 [DE] Germany ............... 195 18 949.3

[51] Int. Cl.[6] .................................................. B60R 9/048
[52] U.S. Cl. ....................... 224/324; 224/319; 224/917.5; 224/331; 224/924
[58] Field of Search ..................... 224/319, 324, 224/917.5, 331, 322, 326, 321, 924, 309; 248/228.4, 230.4, 231.51

[56] References Cited

U.S. PATENT DOCUMENTS

| 2,514,266 | 1/1950 | Walsloger . | |
|---|---|---|---|
| 3,209,970 | 10/1965 | Canell | 224/319 |
| 3,944,179 | 3/1976 | Piper | 248/226 |
| 4,171,759 | 10/1979 | Wnek | 224/45 |
| 4,507,033 | 3/1985 | Boyd | 224/331 |
| 5,009,350 | 4/1991 | Schill et al. | 224/331 |
| 5,419,479 | 5/1995 | Evels et al. | 224/319 |

FOREIGN PATENT DOCUMENTS

| 934495 | 5/1948 | France | 224/324 |
|---|---|---|---|
| 1004722 | 4/1952 | France | 224/319 |
| 4242207A1 | 12/1992 | Germany . | |
| 4328852A1 | 8/1993 | Germany . | |

*Primary Examiner*—Linda J. Sholl
*Attorney, Agent, or Firm*—Evenson, McKeown, Edwards & Lenahan, PLLC

[57] ABSTRACT

An apparatus for securing a load to a motor vehicle comprises at least two load holders which can be fixed to the vehicle body and which each have load securing elements directed in the longitudinal direction of the vehicle for fixing a load extending in the longitudinal direction of the vehicle. A clamping device is provided for fixing the respective load holder to an intermediate carrier which is fixedly connected or can be fixedly connected to the bodywork. The clamping device has clamping jaws which embrace a part of the intermediate carrier. The clamping jaws have a clamping opening matched to the profile of the intermediate carrier for substantially embracing it in the clamping position. The axial direction of the clamping opening extends substantially parallel to the longitudinal direction of the load securing elements.

28 Claims, 18 Drawing Sheets

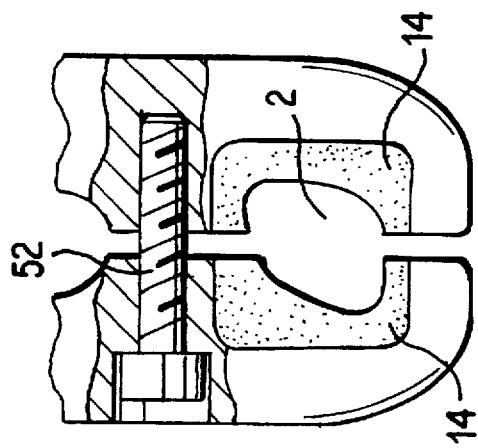
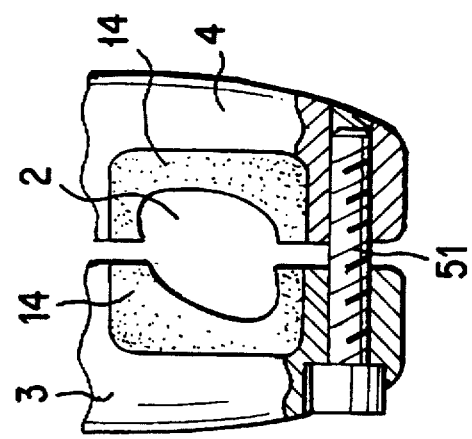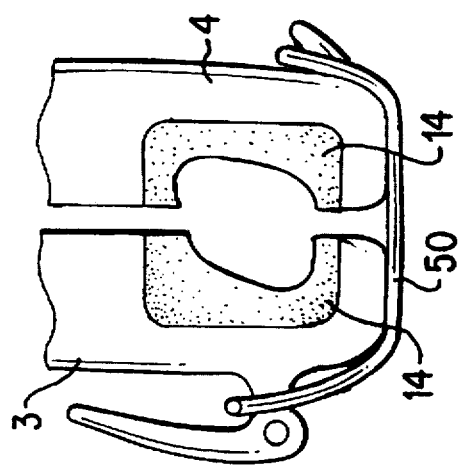

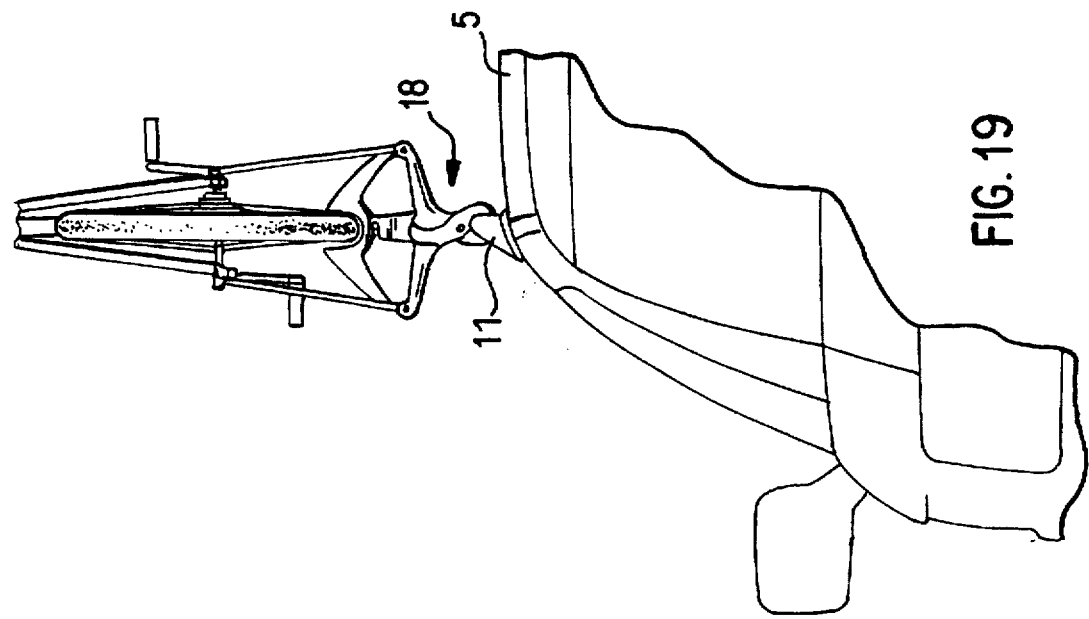
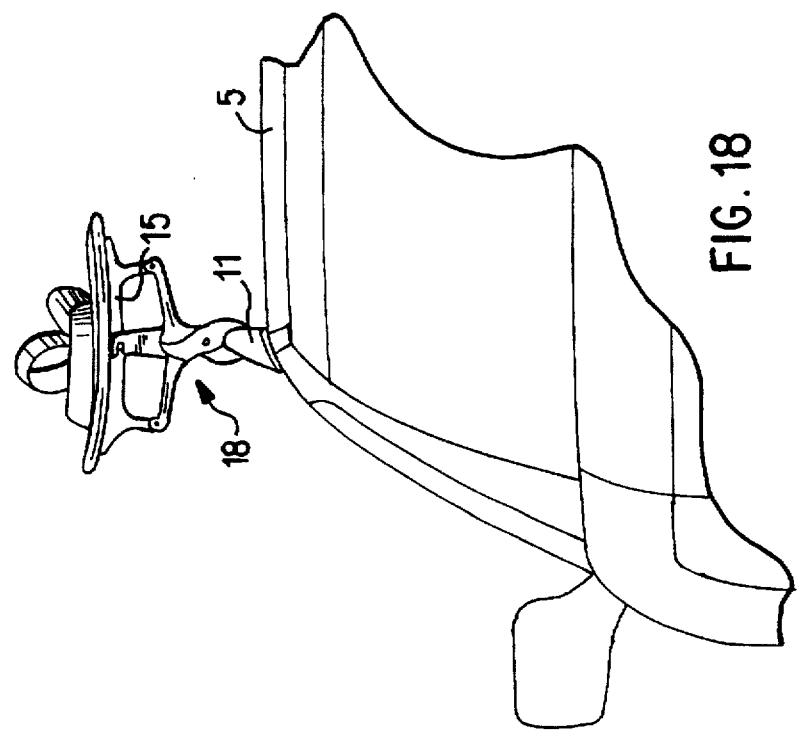
FIG. 19
FIG. 18

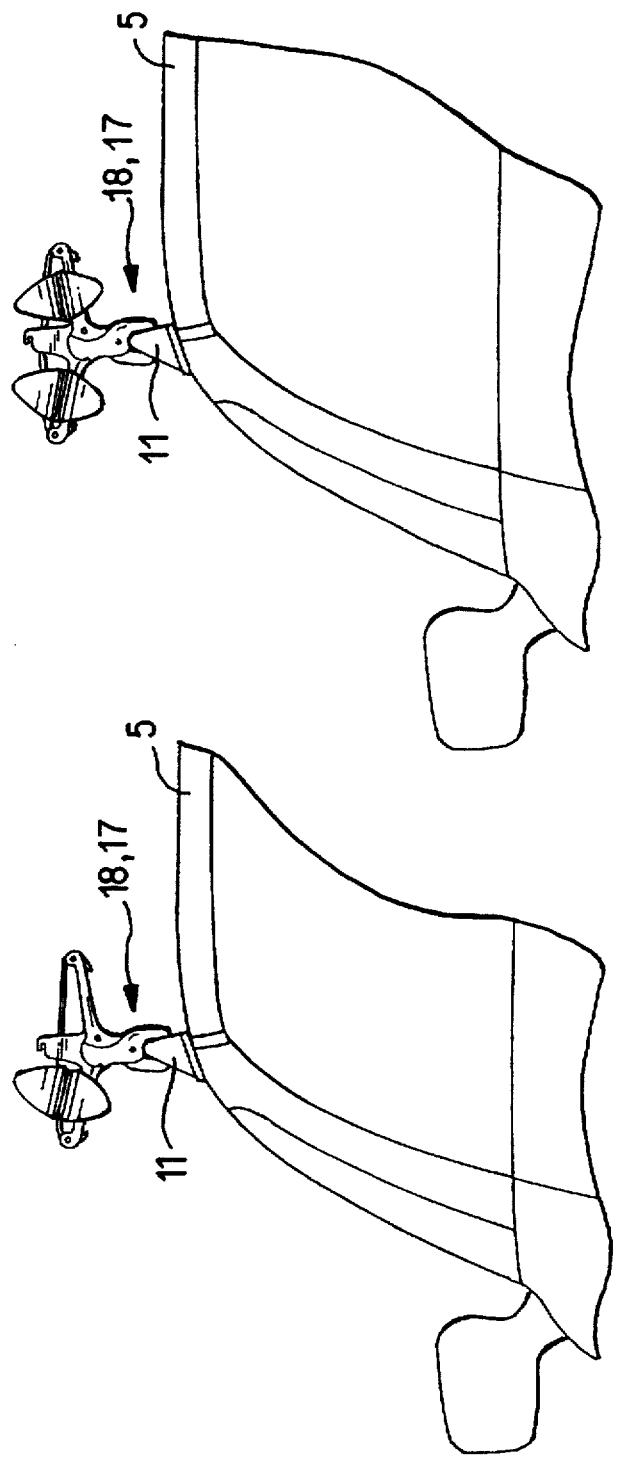

5,779,116

APPARATUS FOR SECURING A LOAD TO A MOTOR VEHICLE

FIELD OF THE INVENTION

The invention concerns an apparatus for securing a load to a motor vehicle.

BACKGROUND OF THE INVENTION

It is a common practice for loads to be mounted on a motor vehicle and more particularly on the roof of a motor vehicle, an option which is particularly desirable when the load to be carried is such that it cannot be carried within the vehicle itself. Such a load may be for example an elongate load such as skis, surfboards, small boats and the like. One form of apparatus for securing a load to a vehicle and more particularly on the roof thereof requires a carrier arrangement in the form of two transverse carriers or bars which extend transversely to the longitudinal direction of the vehicle, over the roof thereof. While such an arrangement affords an adequate support effect for a load to be carried, it has been found that the storage thereof when not in use often takes up a relatively large amount of space. In particular it is not possible for that load carrier to be disposed in the trunk of the vehicle without seriously adversely affecting the amount of available space left.

SUMMARY OF THE INVENTION

An object of the present invention is to provide an apparatus for securing a load to a motor vehicle, which affords a firm securing and supporting effect while not taking up a large amount of space when not in use.

Another object of the present invention is to provide an apparatus for securing a load to a motor vehicle which affords a high degree of versatility in terms of mounting thereof on a vehicle and also in terms of a load to be supported thereby.

Still another object of the present invention is to provide an apparatus for securing a load to a motor vehicle which can be quickly and easily mounted in position on a vehicle and on which a load can be readily fitted.

In accordance with the present invention the foregoing and other objects are attained by an apparatus for securing a load to a motor vehicle comprising at least first and second load holders adapted to be fixed to the vehicle body and each having load securing means directed in the longitudinal direction of the vehicle for securing a load extending in the longitudinal direction of the vehicle. Each load holder has a clamping means for securing the respective load holder to an intermediate carrier which is connected to the vehicle body or which can be connected thereto. The clamping means includes first and second clamping jaws for embracing a part of the intermediate carrier, and the clamping jaws have a clamping opening which is matched to the profile of the intermediate carrier and which in the clamping position substantially embraces the profile and whose longitudinal extent in the axial direction is substantially parallel to the longitudinal direction of the load securing means.

As will be seen in greater detail from the following description of preferred embodiments of the apparatus according to the invention, the apparatus can be used to carry loads extending in the longitudinal direction of a vehicle such as for example skis, boats, surfboards, bicycles and the like, without the use of intermediate carriers which extend transversely to the longitudinal direction of the vehicle, on the vehicle body, for example on the roof of the vehicle but also in the region of the trunk lid or the tailgate of the vehicle. The longitudinally extending inside wall surface which defines the clamping opening provides sufficient stability for securing a load to the vehicle, in the axial direction and also transversely with respect thereto. The fact that at least first and second load holders are used for securing the longitudinally extending load in position affords an assembly consisting of the load holders which are connected to the vehicle body and the load which is secured to the load holders, that assembly involving a positively locking connection between the component parts by virtue of the interengagement between the clamping means and the intermediate carrier and between the securing means and the load. That assembly is so designed that it will remain in a stably positioned condition on the motor vehicle, even when subjected to the effect of high forces acting in any direction thereof from the exterior. Because the clamping opening is of such a configuration that the boundary walls thereof on the clamping jaws, which extend in the axial direction or the longitudinal direction, embrace the profile of the intermediate carrier in the longitudinal or axial direction, and because that direction extends substantially parallel to the longitudinal guidance direction in which the load securing means act with a stabilizing effect on the load to be secured, the apparatus of the invention enjoys a high level of stability.

A suitable form of intermediate carrier may be a roof rail which is fitted on to the vehicle roof. It is also possible to use a rail which is disposed in a sunk position in the vehicle roof and into which is fitted a clamping shoe acting as an intermediate carrier, with a clamping shoe being associated with each load holder.

In addition, when the apparatus is to be employed in the region of a trunk lid which forms a gap with an undercut configuration between the peripherally extending edge of the trunk lid and the adjacent part of the vehicle body, the gap can be used as a securing means for a clamping shoe associated with a respective load holder. Both when using a sunk rail and also when using the trunk lid fixing configuration, use is made of the fact that a gap is formed with one or more undercut configurations, into which the respective clamping shoe can be fixedly fitted.

The load securing means can be laterally secured to the clamping jaws of the load holder, with upwardly directed support or contact surfaces. Preferably the load securing means are formed from one piece with the clamping jaws.

To form the respective load holders, the first and second clamping jaws thereof can be relatively movably connected together by suitable connecting means. Suitable connecting means in that respect are screws, along the bolt portions of which the clamping jaws are movable towards each other from an opened position into a clamping position and can be fixedly connected together by the screw connection in the clamping position.

A preferred form of the connecting means comprises a pivot, about the axis of which the clamping jaws are movable from an opened position into the clamping position.

Preferably the clamping jaws can be connected together by the pivot to constitute a scissor-like assembly.

A clamping portion can be pivotably secured to one of the clamping jaws, the clamping portion being operable for locking the clamping jaws relative to each other in the clamping position thereof in which the profile of the intermediate carrier is embraced in positive locking relationship. That provides a positively locking connection between the intermediate carrier and the respective load holder.

3

It will be noted that the load holders constituting the apparatus for securing a load to a vehicle can be stored when not in use in the vehicle itself, for example in the trunk, but also outside the vehicle, without occupying a great deal of space in the storage condition.

Further objects, features and advantages of the invention will be apparent from the following description of preferred embodiments thereof.

BRIEF DESCRIPTION OF THE DRAWINGS

FIG. 14 shows a first embodiment of a device for securing the clamping position, FIG. 15 shows a second embodiment of a device for securing the clamping position, FIG. 16 shows a third embodiment of a device for securing the clamping position, FIG. 18 shows a configuration of the load holder as a snowboard holder, FIG. 19 is a view from the rear of the load holder in the form of a bicycle holder, FIGS. 23 through 25 show an embodiment of the apparatus in the form of a ski holder.

DESCRIPTION OF PREFERRED EMBODIMENTS

Figure 1:
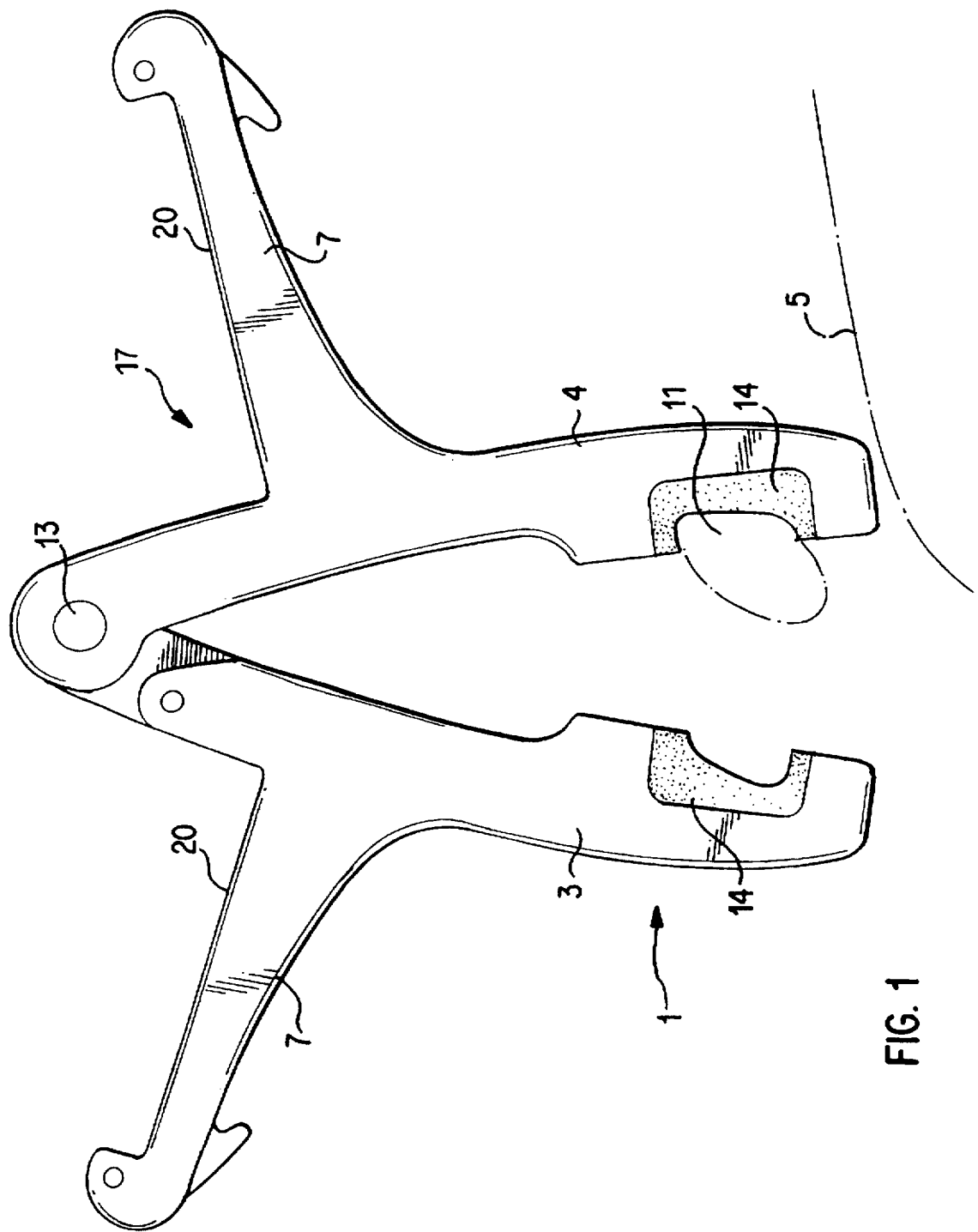
FIG. 1 shows a first embodiment which can be clamped to a rail fitted on the roof of a motor vehicle and extending in the longitudinal direction thereof, in the opened position.
Figure 2:
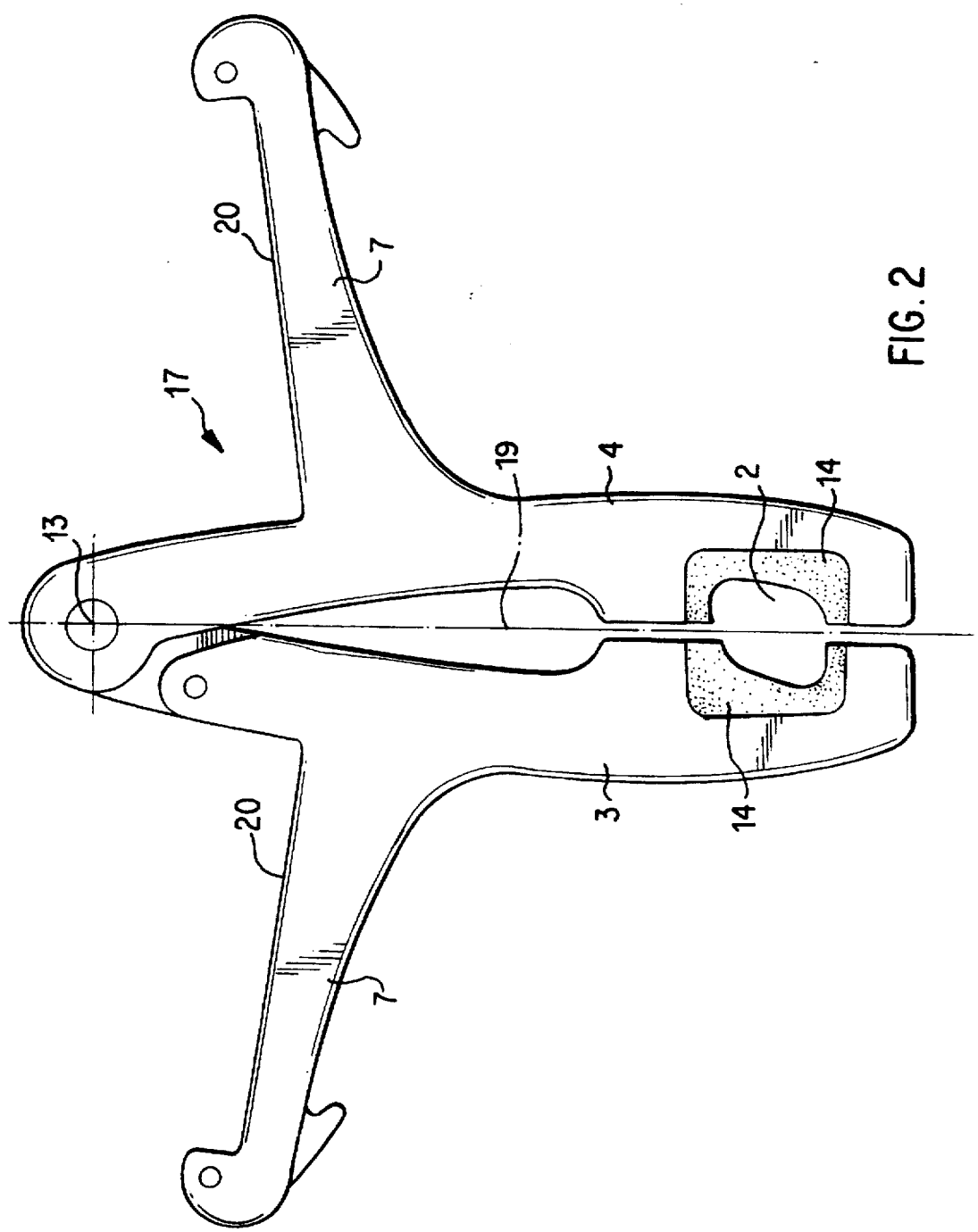
FIG. 2 shows the FIG. 1 embodiment in the clamping position.

Referring firstly to FIGS. 1 through 4, shown therein is an embodiment of a load holder 17 which includes a clamping device 1 with which the load holder 17 can be secured to a rail diagrammatically indicated at 11 in FIG. 1, which extends in the longitudinal direction of the vehicle and more particularly the vehicle roof. The clamping device 1 comprises first and second clamping jaws 3 and 4 which are pivotably connected together by way of a pivot 13. The clamping jaws 3 and 4 are so designed that they define and embrace a clamping opening which is indicated at 2 in FIG. 2 and which extends in the longitudinal direction. In the closed condition as shown in FIG. 2 the clamping opening 2 extends in the form of a substantially closed and substantially cylindrical opening, the axial extent of which extends parallel to the extent or longitudinal configuration of the rail 11. When the load holder 17 is fixed in position the two clamping jaws 3 and 4 embrace the profile of the rail 11 so that the rail profile is accommodated in the clamping opening 2. The cross-section of the clamping opening 2 is suitably matched to the cross-sectional profile of the rail 11, as can be seen from a comparison between FIGS. 1 and 2. As the clamping jaws 3 are of a given longitudinal extent in the longitudinal direction of the vehicle to which they are fitted, that prevents the load holder 17 from tipping or tilting about an axis which extends transversely relative to the rail 11. Inserts 14 can be provided on each of the clamping jaws 3 and 4 in suitable recesses therein in the region of the opening 2 to be formed by the clamping jaws 3 and 4, for the purposes of adaptation to the respectively desired profile of the rail 11. The inward boundary surfaces defining the inserts 14 form a longitudinally extending inside wall configuration which, in the clamping position shown in FIG. 2, defines the clamping opening 2 and thus embraces in positively locking relationship the profile of the rail 11 over a length corresponding to the thickness of the material of the inserts 14. The inserts 14 can be interchangeably arranged in the clamping jaws 3 and 4 so as to provide for adaptation to respective different rail profiles.

Disposed on the clamping jaws 3 and 4 are lateral load securing means as indicated at 7. They are in the form of outwardly projecting legs or cantilever arms which project in opposite directions away from the clamping jaws 3 and 4 approximately at a right angle thereto. The load securing means 7 have upwardly directed contact support surfaces 20 for a load to be secured in position, for example skis. In the illustrated embodiment the load securing means 7 are disposed in a plane between the pivot 13 and the clamping opening 2.

As the pivot 13 is disposed above the clamping opening 2, the load holder 17 can be comfortably and conveniently fitted on to the rail 11 from above when the clamping jaws 3 and 4 are in the open position.

Figure 3:
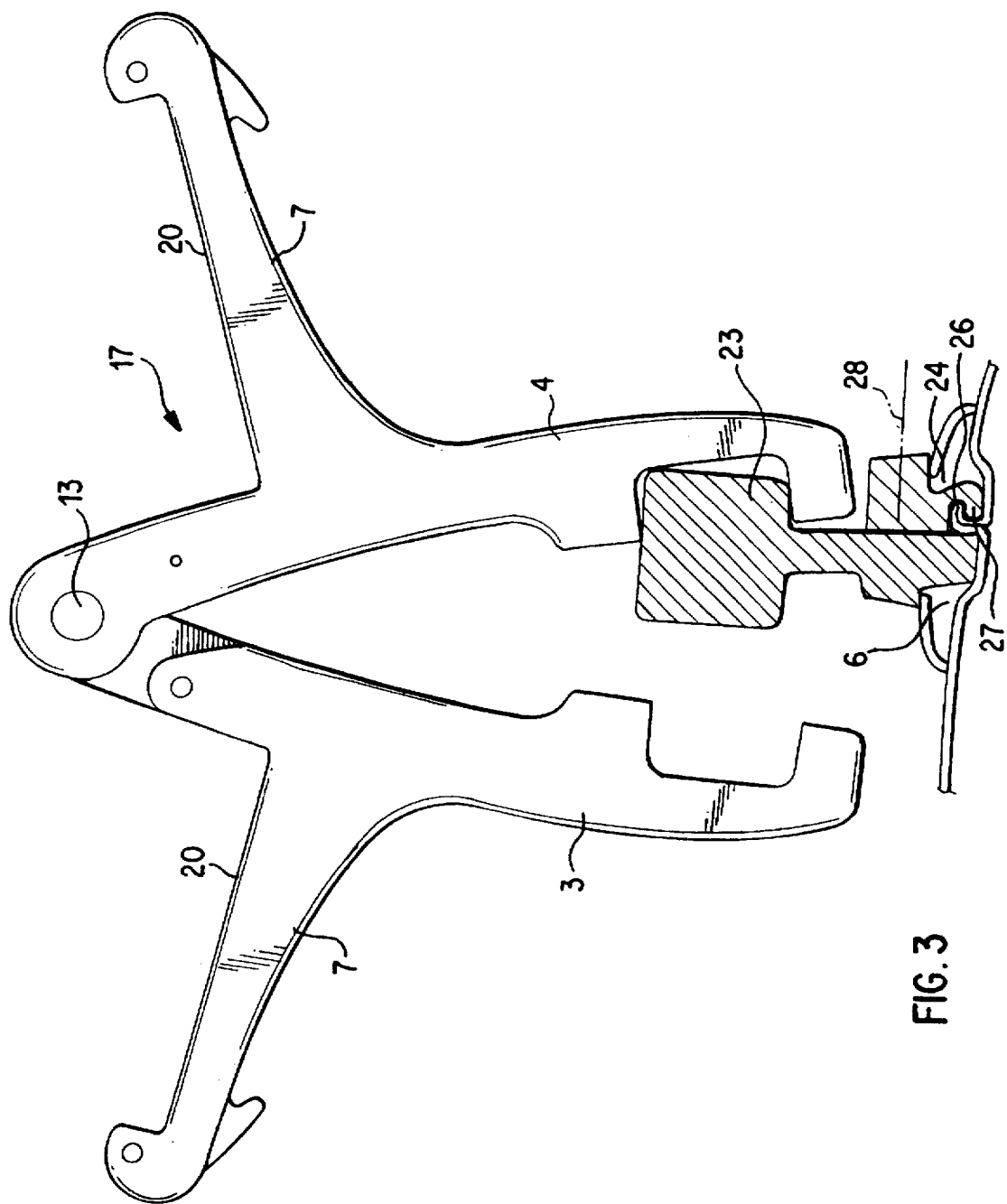
FIG. 3 shows the FIG. 1 embodiment in the opened position, for securing to a clamping shoe mounted on a vehicle roof.
Figure 4:
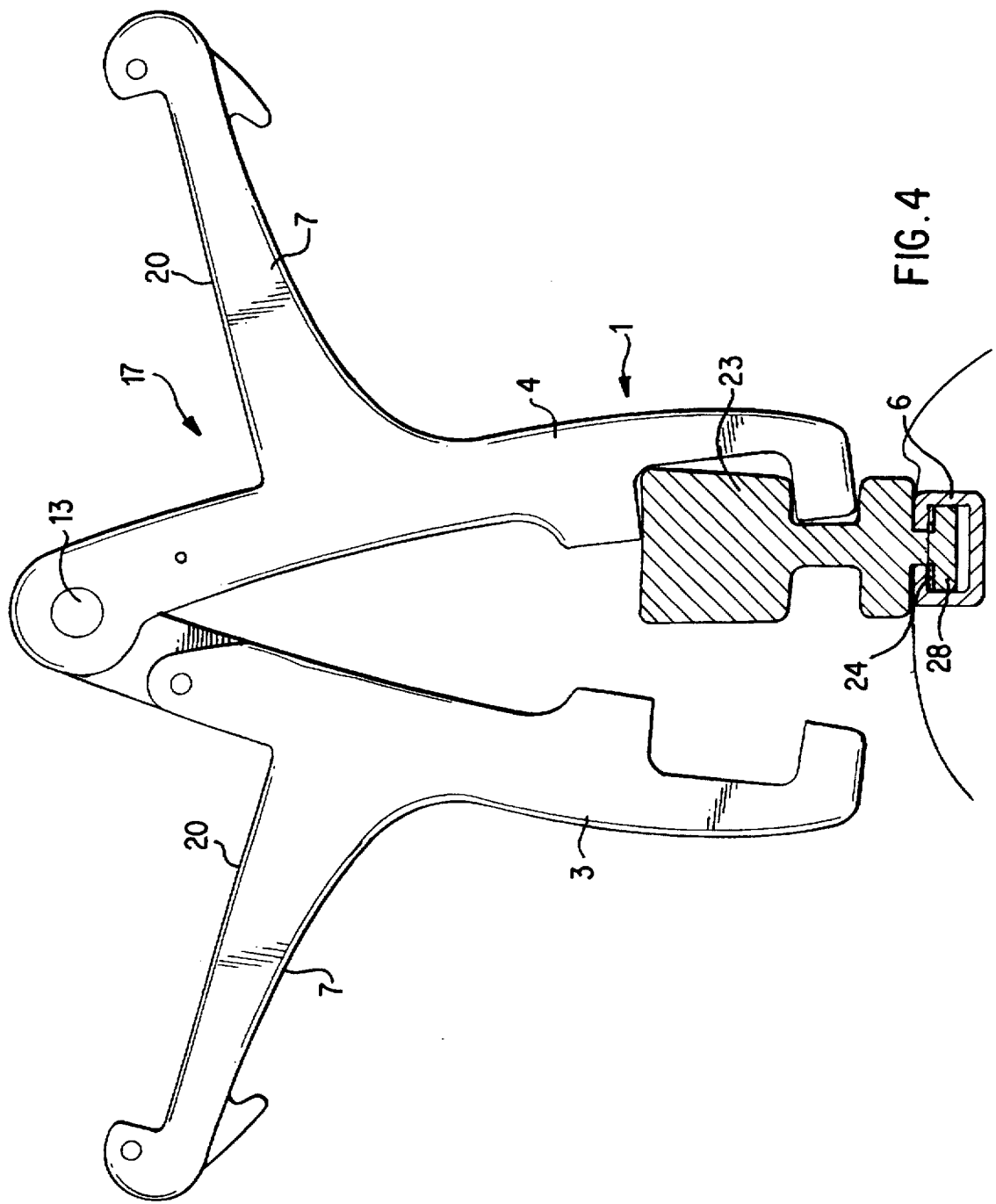
FIG. 4 shows the FIG. 1 embodiment for securing to another clamping shoe mounted on a vehicle roof.

Reference will now be made to FIGS. 3 and 4 showing the load holder used in association with a clamping shoe. It will be seen from FIGS. 3 and 4 that the load holder 17 can also be secured to a vehicle body structure using a clamping shoe 23 which is associated with each load holder 17 and which is employed as an intermediate carrier, instead of the rail 11 shown in FIG. 1 and fitted on to a vehicle roof 5. The clamping shoe 23 in the two embodiments of FIGS. 3 and 4 is fitted through a gap or slot 24 which is formed in the vehicle bodywork and brought into positively locking relationship with an undercut configuration defined beneath the gap 24. In the embodiment shown in FIG. 3 the clamping shoe 23 is inserted with a lower portion thereof through the gap 24 into a rail 6 which is arranged in a sunk position in the vehicle roof. The rail 6 has a substantially horizontally extending groove or channel 26 forming an undercut configuration into which an engagement portion 27 of a securing member can be clamped by means of a fixing screw 28 shown in broken lines in FIG. 3. In that way the clamping shoe 23 is fixedly connected to the vehicle body.

In the embodiment shown in FIG. 4 the lower portion of the clamping shoe 23, which projects through the gap 24, is also anchored with a clamping screw 28 in the railing 6 which is of a U-shaped configuration and which is also disposed in a sunk relationship in the vehicle roof.

It will be noted that in the case of the embodiments shown in FIGS. 3 and 4 also the clamping opening can be matched to the profile of the clamping shoe 23 by the use of inserts as indicated at 14 in FIGS. 1 and 2.

Figure 11:
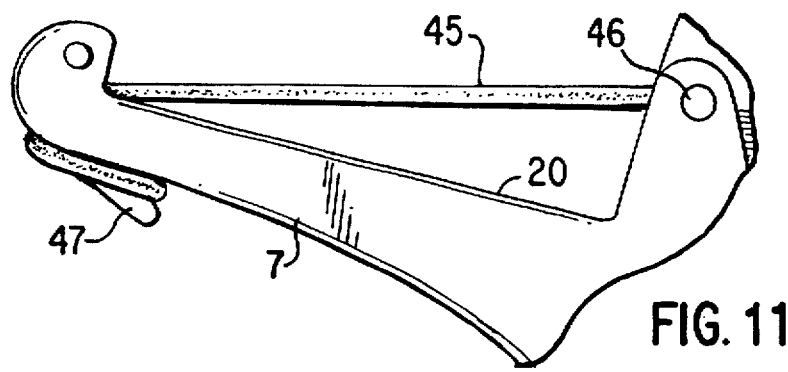
FIG. 11 shows a first embodiment of an arrangement for holding a load on a load holder.
Figure 12:
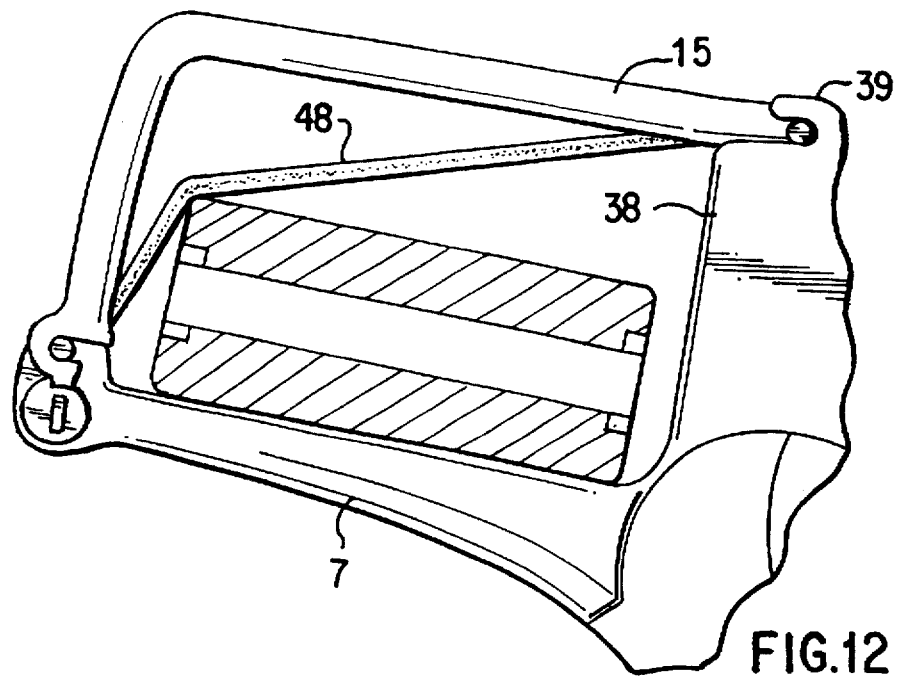
FIG. 12 shows a second embodiment of an arrangement for holding a load on a load holder.
Figure 13:
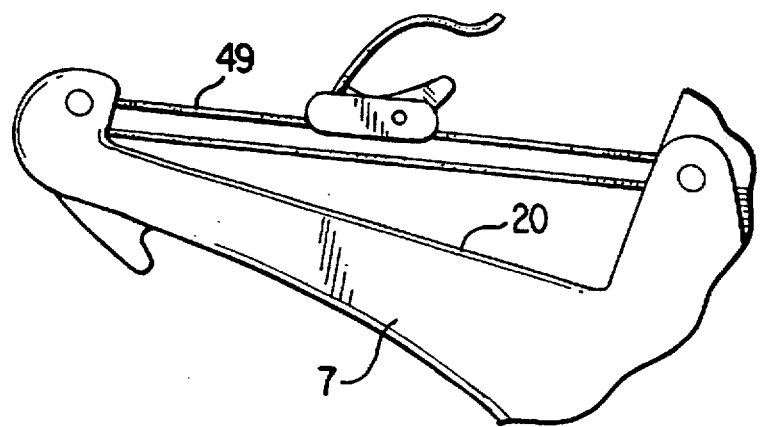
FIG. 13 shows a third embodiment of an arrangement for holding a load on a load holder.

The load fixing means 7 in FIGS. 3 and 4 have the upwardly directed support surfaces 20 on to which a load or loads to be transported can be laid. Elongate loads are carried by two load holders 17. The load or loads to be transported are fixed to the respective load securing means by way of fixing means which can be laid over the load to be secured in position and of which embodiments are shown in FIGS. 11 through 13 to which reference will be made hereinafter.

Figure 5:
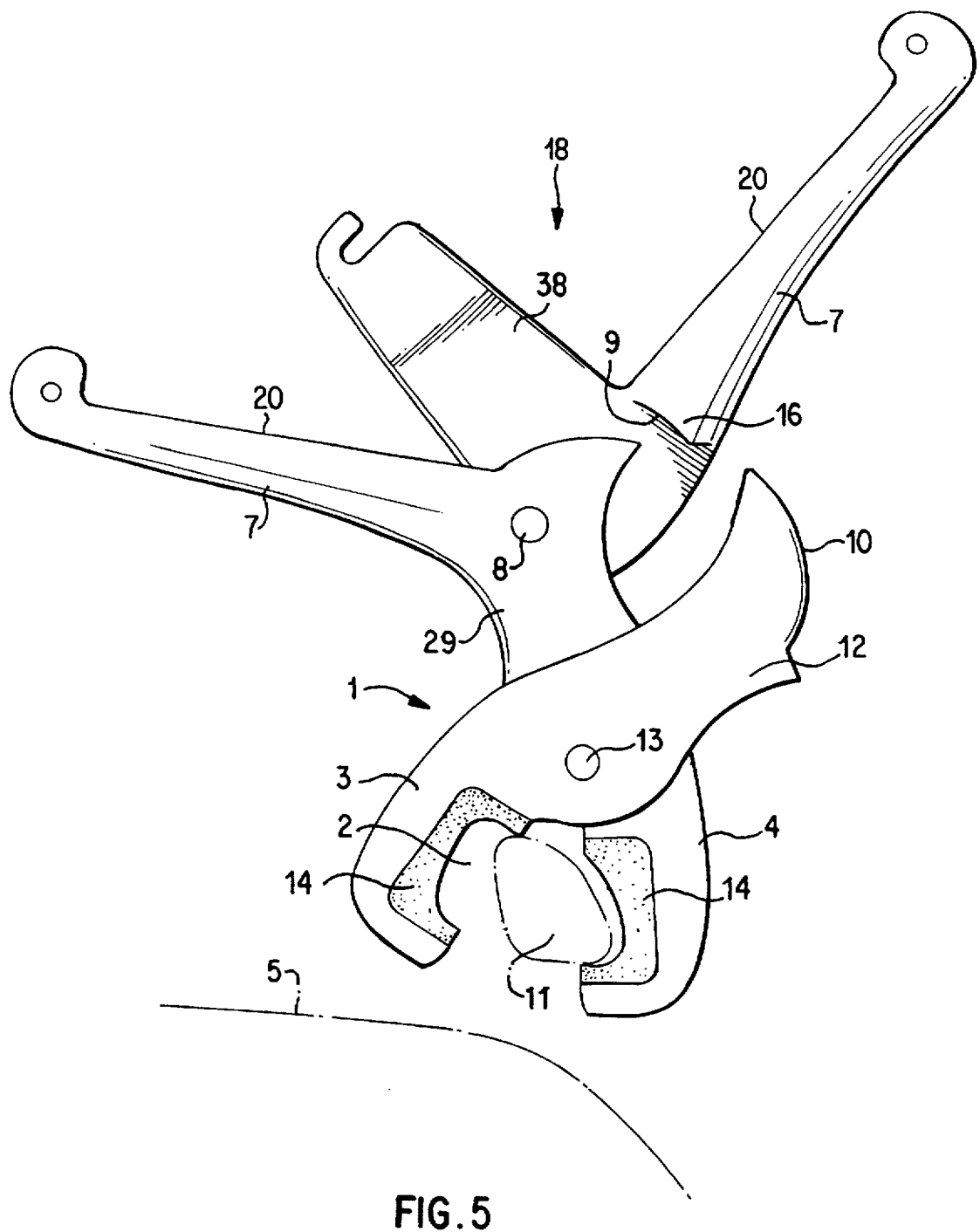
FIG. 5 shows a second embodiment of a load holder which can be secured to a rail fitted on a vehicle roof, in the open position.
Figure 6:
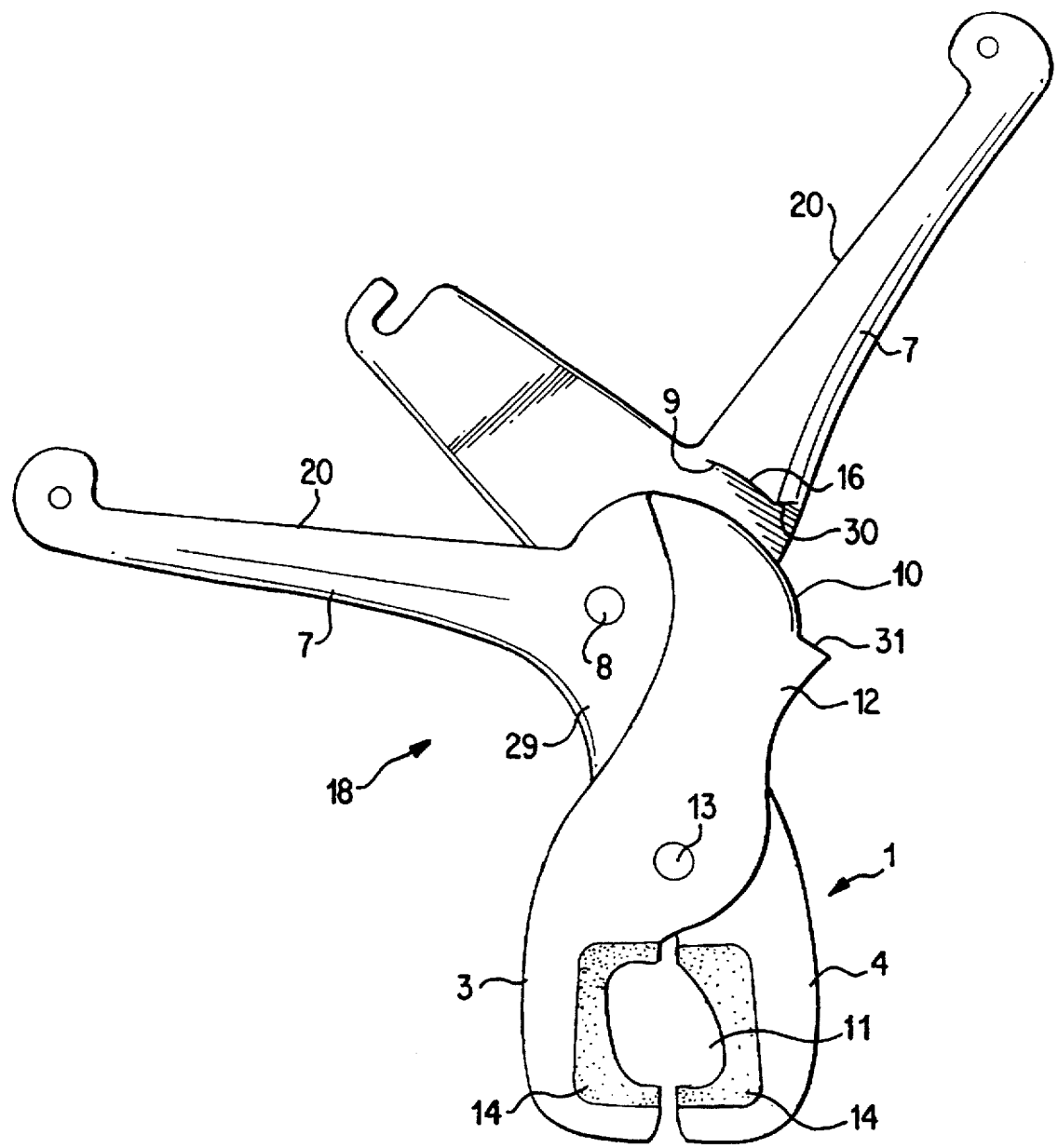
FIG. 6 shows the FIG. 5 embodiment in an intermediate position just before the clamping position.
Figure 7:
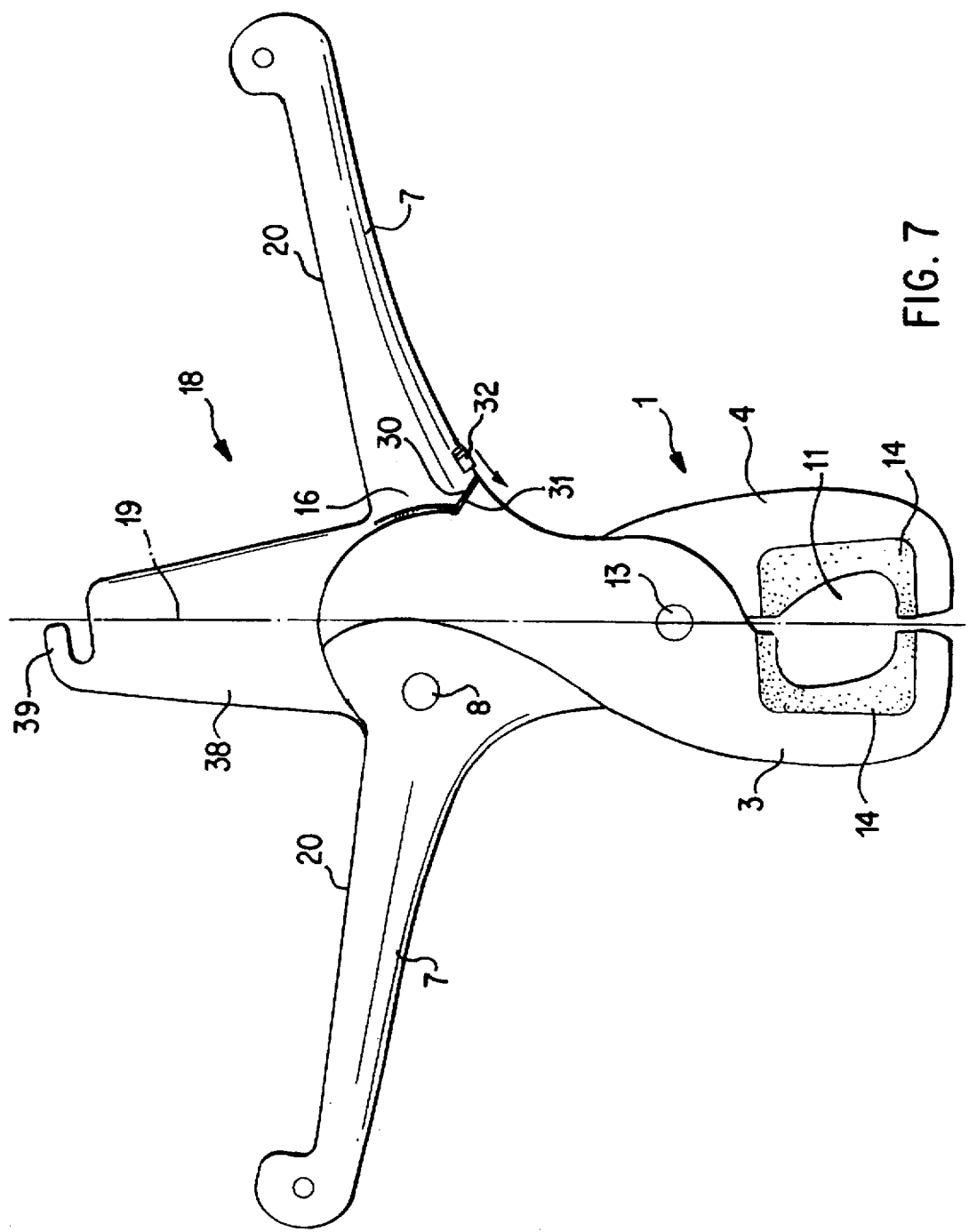
FIG. 7 shows the FIG. 5 embodiment in the clamping position.

In the case of the embodiment of a load holder as indicated at 18 in FIGS. 5, 6 and 7, the clamping jaws 3 and 4 of the load holder 18 are pivotally connected together by way of the pivot 13 in a scissor-like configuration. This embodiment is shown for securing to a rail 11 on a motor vehicle roof 5. The rail 11 illustrated is the rail which is arranged on the vehicle roof at the right-hand side thereof. The load securing means 7 in this embodiment are both provided on the clamping jaw 4. The one load securing means 7 is provided rigidly on the clamping jaw 4 and is in one piece with the body of the clamping jaw. The other load securing means 7 is disposed pivotably on the clamping jaw 4 and is formed in one piece with a clamping portion 16. FIG. 5 shows the load holder 18 in an opened condition. In that condition the load holder 18 is fitted on to the rail 11. FIG. 6 shows the condition in which the two clamping jaws 3 and 4 are closed so that the profile of the rail 11 is embraced in positively locking relationship by the clamping opening 2. The clamping opening 2 can be formed by inserts 14 fitted to the clamping jaws 3 and 4, as in the case of the embodiment shown in FIGS. 1 through 4.

When the clamping jaws 3 and 4 are closed they are pivoted about the pivot 13 which is disposed in a plane between the load securing means 7 and the clamping opening 2. In the condition of being closed in the clamping position, as shown in FIG. 6, the scissor assembly formed by the two clamping jaws 3 and 4 can be clamped to prevent it from opening. That purpose is served by the clamping member 16 which is mounted on the clamping jaw 4 pivotably about the pivot 8. The clamping member 16 has a clamping or bracing surface 9 in the form of a curved surface which can be brought into clamping engagement with a clamping or bracing surface 10 adjacent thereto on the clamping jaw 3. The surface 10 is provided on the scissor assembly portion 12 which is above the pivot 13 at which the two clamping jaws 3 and 4 are pivotably connected together. The pivot 8 at which the clamping member 16 is pivotably mounted on the clamping jaw 4 is also disposed on the upper scissor assembly portion as indicated at 29 of the clamping jaw 4. In the definitive closed and locked position as shown in FIG. 7 abutments 30 and 31 on the clamping member 16 and on the scissor assembly portion 12 of the clamping jaw 3 bear against each other.

In the definitive clamping position as shown in FIG. 7, as in the embodiment illustrated in FIGS. 1 through 4, the load securing means extend in opposite directions with respect to a longitudinal central plane as diagrammatically indicated at 19 in FIG. 7. The support surfaces 20 are also directed upwardly and can thus receive and support a load to be transported.

A slider as indicated at 32 in FIG. 7 can also be provided on the clamping member 16. When the load carrier 18 is in the clamping position shown in FIG. 7, the slider 32 can be pushed over the two co-operating abutments 30 and 31 so as to ensure that the load holder is additionally secured in the clamping position.

Figure 8:
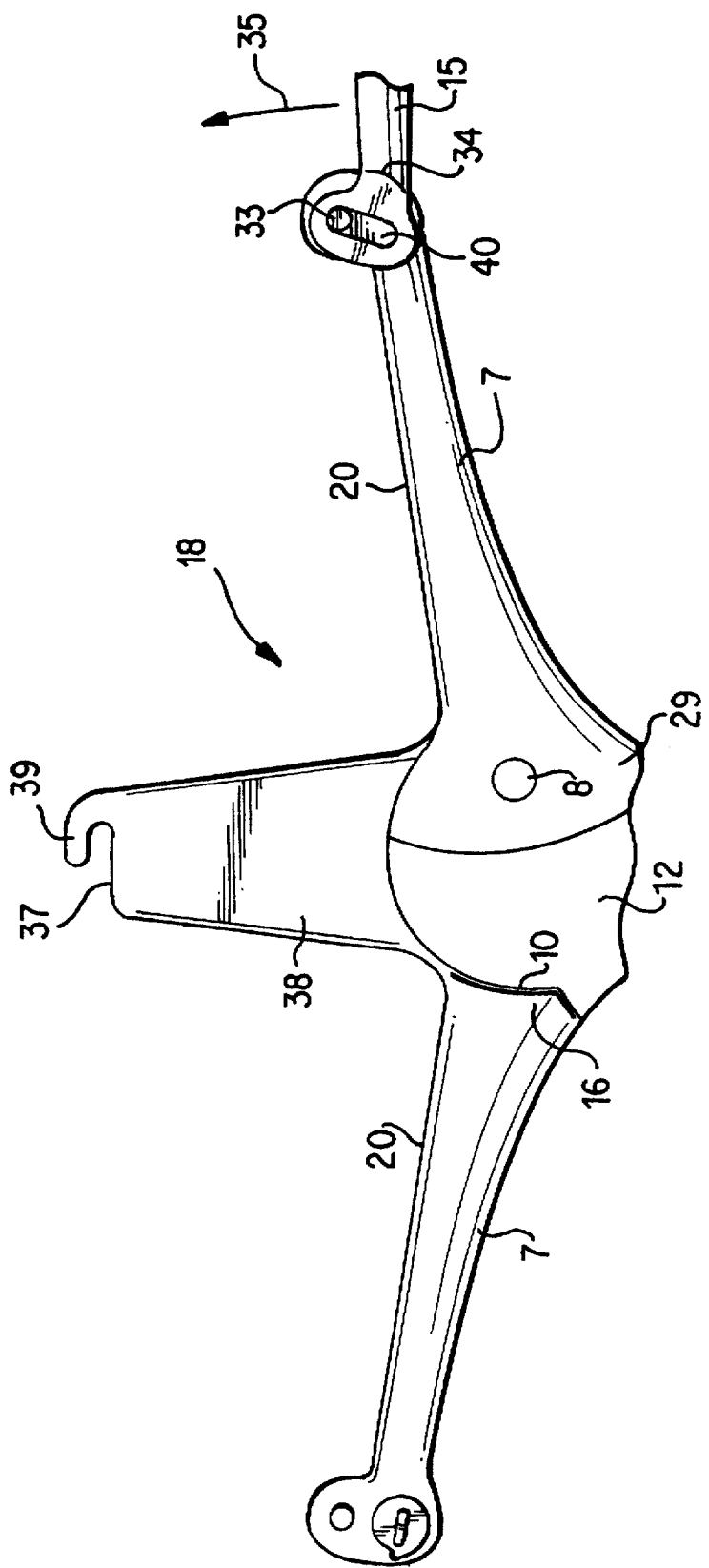
FIG. 8 shows a further configuration of the embodiments of the invention involving the addition of a holding loop with the holding loop in an open position.
Figure 9:
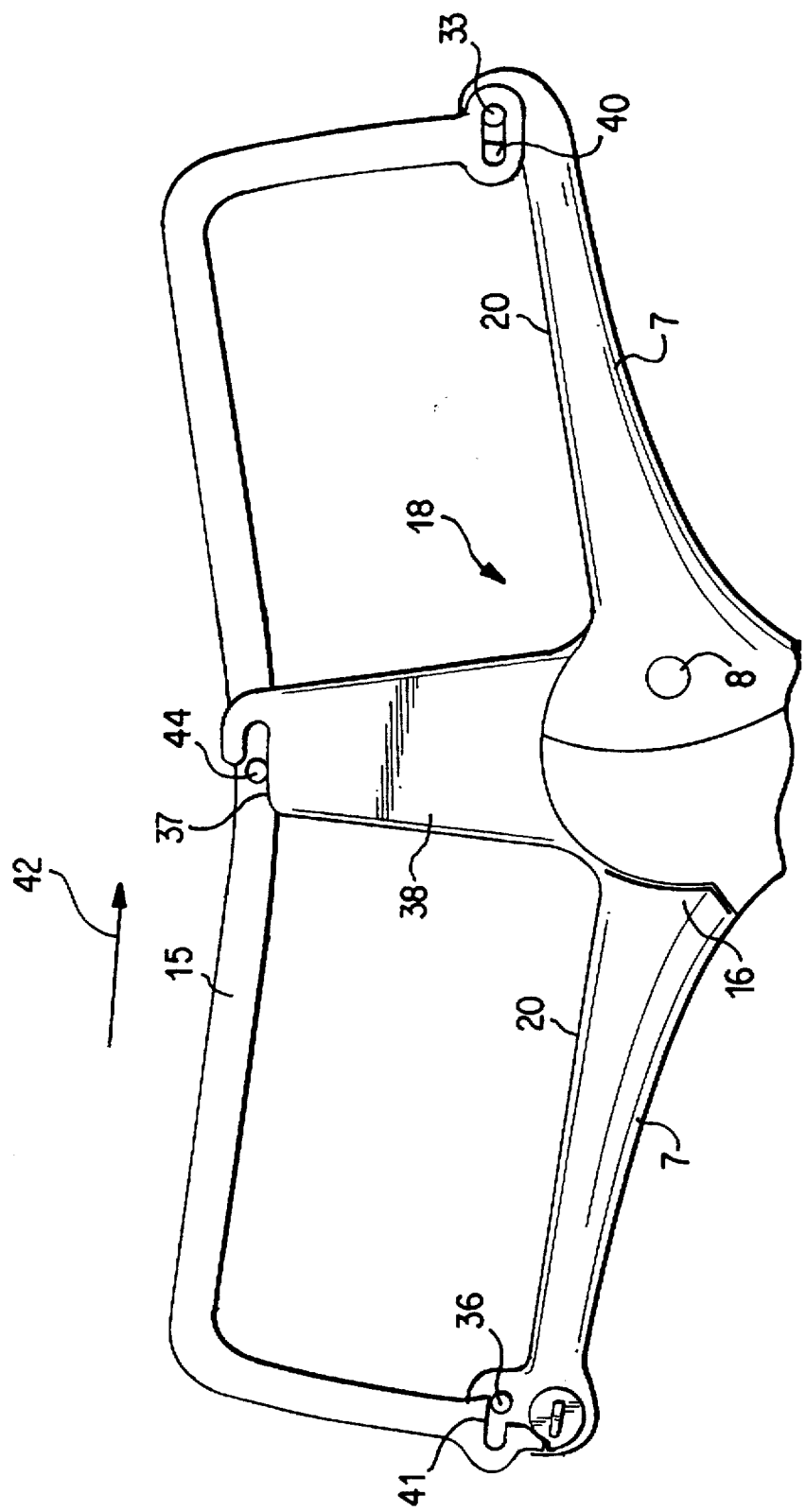
FIG. 9 shows the holding loop of FIG. 8 in a position of having been pivoted over the load holder.
Figure 10:
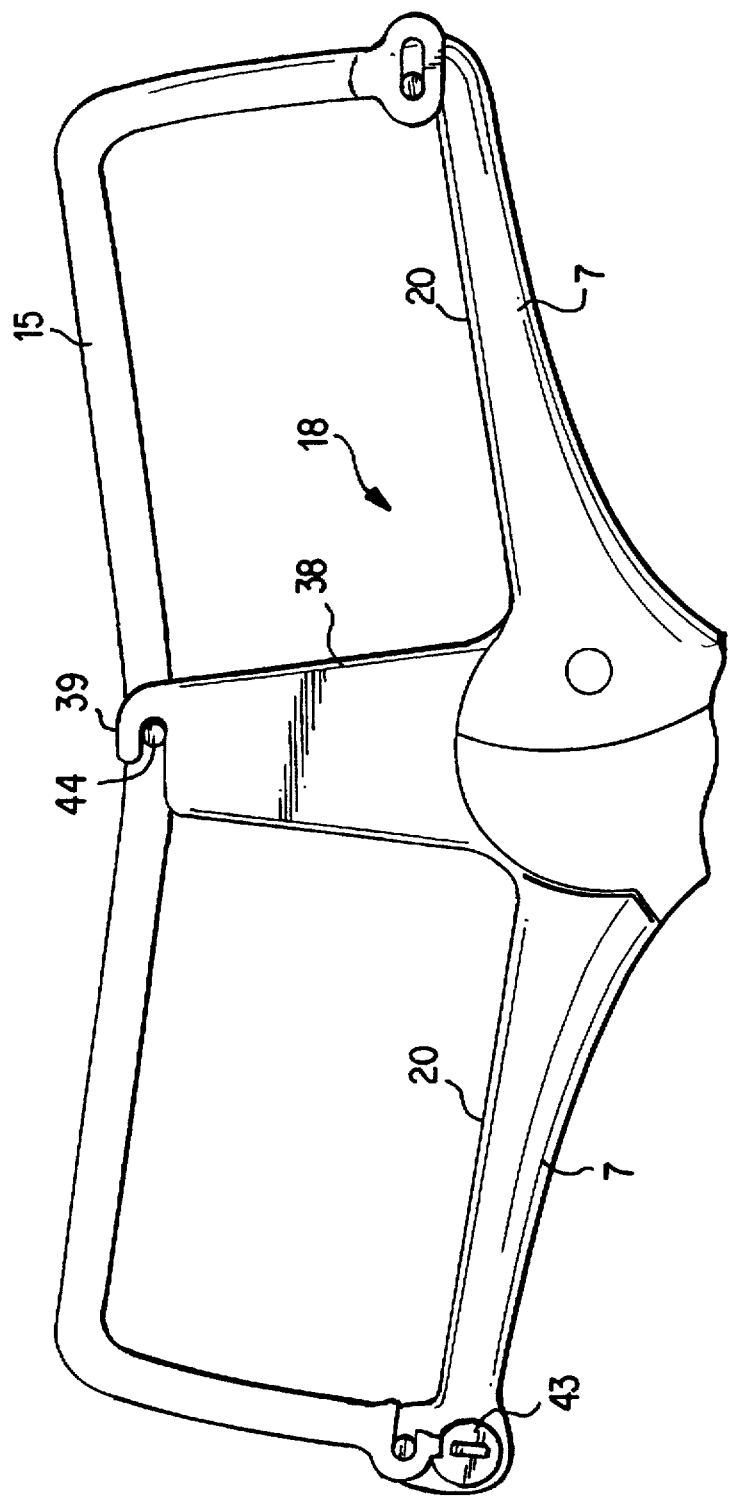
FIG. 10 shows the holding loop in a locked position.

Referring now to FIGS. 8 through 10, a locking loop 15 can be mounted pivotably on the load securing means 7 which is rigidly connected to the upper scissor assembly portion 29 of the clamping jaw 4. The views shown in FIGS. 8 through 10 illustrate the upper part of a load holder 18 which is secured to the left-hand side of a vehicle on a railing as indicated at 11 in FIG. 6 or an associated clamping shoe as illustrated for example in FIGS. 3 and 4. The locking loop 15 is arranged pivotably about a pivot axis 33 formed by a cylindrical pin at the outer end of the load securing means 7. In the outwardly pivoted or extended position as shown in FIG. 8 an abutment 34 on the loop 15 prevents the loop 15 from dropping down and hitting against the roof of the vehicle or a part of the bodywork beneath the load holder 18.

In order to move the locking loop 15 into the position shown in FIG. 9 in which the locking loop 15 extends over the support surfaces 20 of the two load securing means 7.. the locking loop 15 is pivoted in the counter-clockwise direction as indicated by the arrow 35 in FIG. 8 about its pivot axis 33. In that position the locking loop 15 is supported at three points on the load holder 18. The one support point is the pivot axis 33 at the end of the right-hand load securing means 7, the second support point is at the end of the left-hand load securing means 7, for example in the form of a cylindrical pin 36, while the third support point on the load holder 18 is a support edge 37 on a vertical support portion 38 which is formed integrally on the clamping member 16.

A locking hook as indicated at 39 in FIGS. 8 and 10 is also formed on the support portion 38 above the support edge 37. The locking loop 15 is also mounted at the pivot axis 33 by means of a slot 40. At the cylindrical pin 36, the locking loop 15 is supported by a support edge indicated at 41 in FIG. 9. To provide central support for the locking loop 15, the locking loop 15 has a locking pin which is indicated at 44 in FIGS. 9 and 10 and which is in the form of a cylindrical pin lying on the support edge 37. As can be seen in particular from FIG. 9 the support edge 41 at the outer end of the locking loop 15, the support edge 37 on the vertical support portion 38 and the slot at the pivot axis 33 of the locking loop 15 extend substantially parallel to each other, in the position illustrated therein. In order to move the locking loop 15 into its locked position shown in FIG. 10, it is displaced towards the right from the position illustrated in FIG. 9 so as to move into the definitive position illustrated in FIG. 10. The direction of such displacement is identified by arrow 42 in FIG. 9. In the definitive locking position shown in FIG. 10, transverse movement of the loop 15 back into the position shown in FIG. 9 can be prevented by a lock device 43. In that way the entire load carrier 18 is locked in such a way as to be theft-proof and impact-resistant.

It will be seen that, in the position of the load holder shown in FIG. 10, the locking loop 15 extends over the contact surfaces 20 of the two load securing means 7. The locking loop 15 together with the load securing means 7 thus forms a closed frame structure so that the load is securely held on the load holder 18. In the locked position as illustrated in FIG. 10 the locking pin 44 on the locking loop 15 is disposed underneath the locking hook 39 provided on the vertical support portion 38. That provides a three-point support action for the locking loop 15 on the load holder 18 and also provides for securely locking the locking loop 15 to the load holder 18.

It will be appreciated that the locking loop 15 can also be provided in a corresponding manner on the load holder 17 of the embodiment shown in FIGS. 1 through 4.

Reference will now be made to FIGS. 11 through 13 showing embodiments of fixing means for securing a load, for example skis, on the support surfaces 20 of the load securing means 7. It will be seen that the fixing means extend over the respective support surface 20 to brace a load thereagainst.

The fixing means shown in FIG. 11 is a rubber fixing member 45 such as a rubber cord which is anchored at the right-hand side of the load securing means 7 at an anchorage location 46 on the corresponding clamping jaw. The rubber fixing member 45 can be connected by means of an eye (not referenced) to a hook 47 on the other end of the load securing means 7.

In FIG. 12, the fixing means is in the form of a rubber fixing member or cord 48 which extends substantially diagonally across the opening of a frame configuration defined by the locking loop 15 and the co-operating load securing means 7. The rubber fixing member 48 can be stretched over both of the diametrally extending load securing means 7 and is supported at the center on the vertical support portion 38.

In the embodiment shown in FIG. 13 a clamping or fixing strap 49 is passed over the support surface 20 and can be suitably tightened by a lock or buckle device (not referenced).

FIGS. 14 through 16 now show additional connecting means with which the clamping fit of the clamping jaws on the profile of the intermediate carrier constituted by the roof rail 11 or the clamping shoe 23 respectively can be secured. The embodiment illustrated in FIG. 14 provides an additional clamping effect by means of a connecting link 50 which embraces the clamping jaws 3 and 4 at the underside or lower end thereof and which can be suitably tightened by an over-center lever (shown but not referenced).

The embodiment illustrated in FIG. 15 uses a connecting screw 51 to ensure that the clamping fit of the clamping jaws 3 and 4 is properly secured.

The embodiment illustrated in FIG. 16 also provides a screw connection 52 which in this case, unlike the FIG. 15 construction, is disposed above the clamping opening 2. It is also possible to use the two screw connections 51 and 52 at the same time, that is to say one beneath and one above the clamping opening 2.

Figure 17:
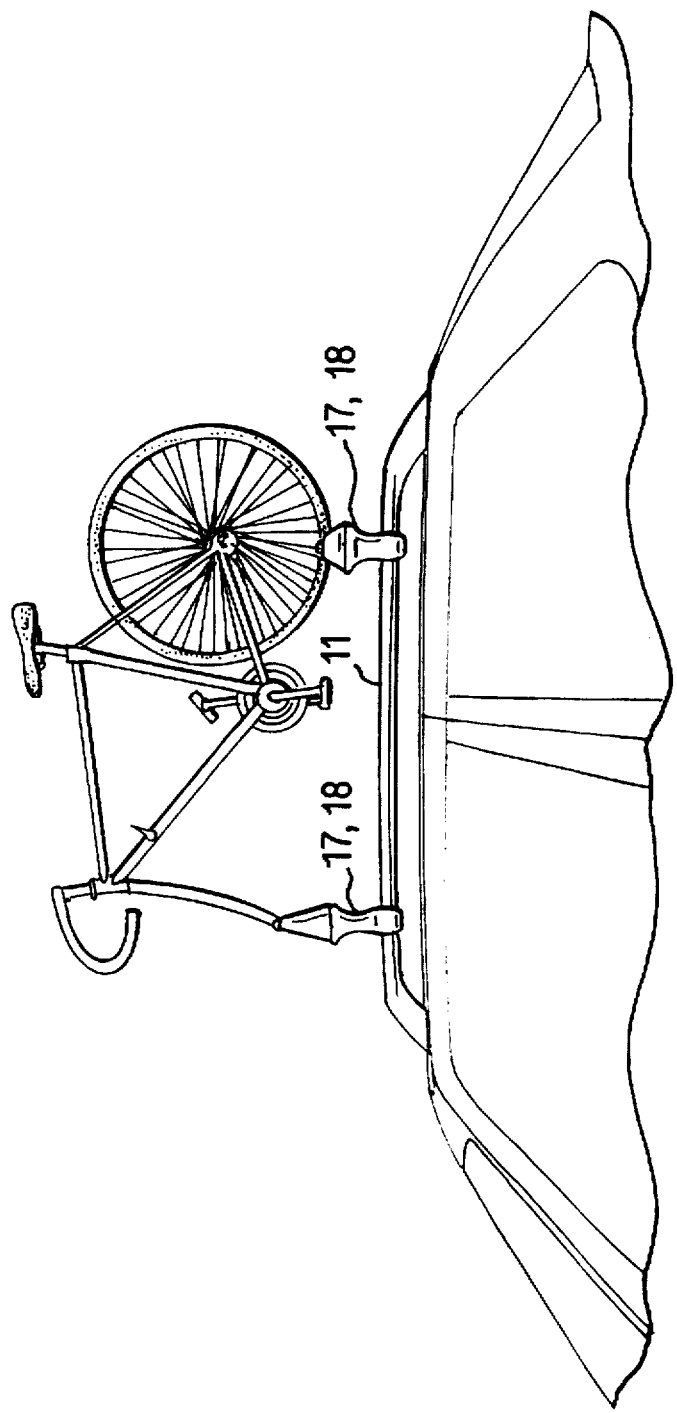
FIG. 17 is a side view of the apparatus in the form of wheel holders.

FIG. 17 shows a configuration of the securing apparatus in the form of a wheel holder, for example for mounting a bicycle on a motor vehicle roof. A securing apparatus for a bicycle is fixed to the rail 11 on the vehicle roof by means of two load holders 17 and 18.

In the embodiment illustrated in FIG. 18, the surface of the locking loop 15 in the case of the load holder 18 is used as a support surface for supporting a snowboard. Two load holders 18 form the securing apparatus for the snowboard which, when mounted on the vehicle roof, extends in the longitudinal direction theeof. For that purpose the two load holders are secured to the rail 11 on the vehicle roof as indicated at 5.

FIG. 19 is a view of the manner of mounting a bicycle on the roof 5 of a motor vehicle, from the rear thereof. In this case also it will be seen that a fixing apparatus for transporting a load and more particularly, in the illustrated situation, for transporting a bicycle, on the roof of a motor vehicle, is afforded without involving the use of transverse bearers or roof bars, just by virtue of the load holders 18 being secured to the rail 11 which extends in the lengthwise direction of the vehicle roof 5.

Figure 21:
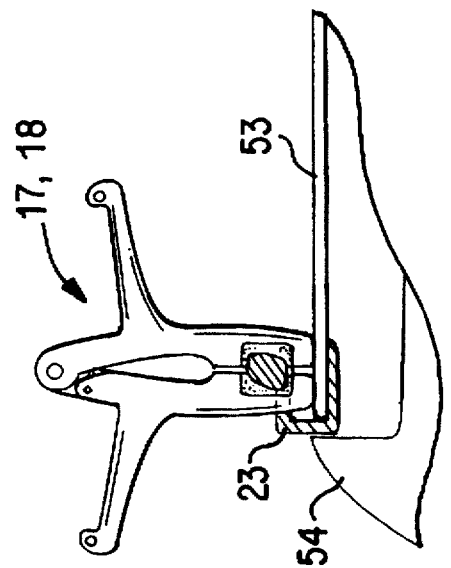
FIG. 21 shows a load holder which can be fixed in the region of a motor vehicle trunk lid.
Figure 20:
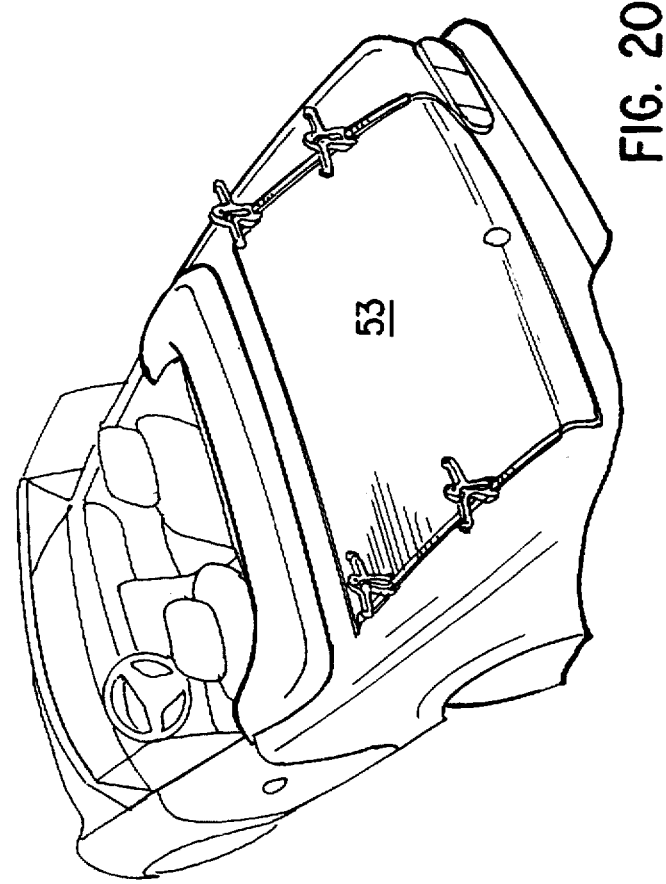
FIG. 20 is a perspective view showing an arrangement of four load holders in the region of a motor vehicle trunk.

FIG. 20 shows a further possible use of the load holders 17 and 18 in the region of the trunk of a motor vehicle, more especially a convertible or cabriolet. As can be clearly seen from FIG. 21 the load holders are fixed in position on the trunk lid by means of a clamping shoe 23 which is gripped in the gap between the trunk lid 53 and an adjacent portion 54 of the vehicle body. Loads can then be secured to the load holders in the manner already described above.

Figure 22:
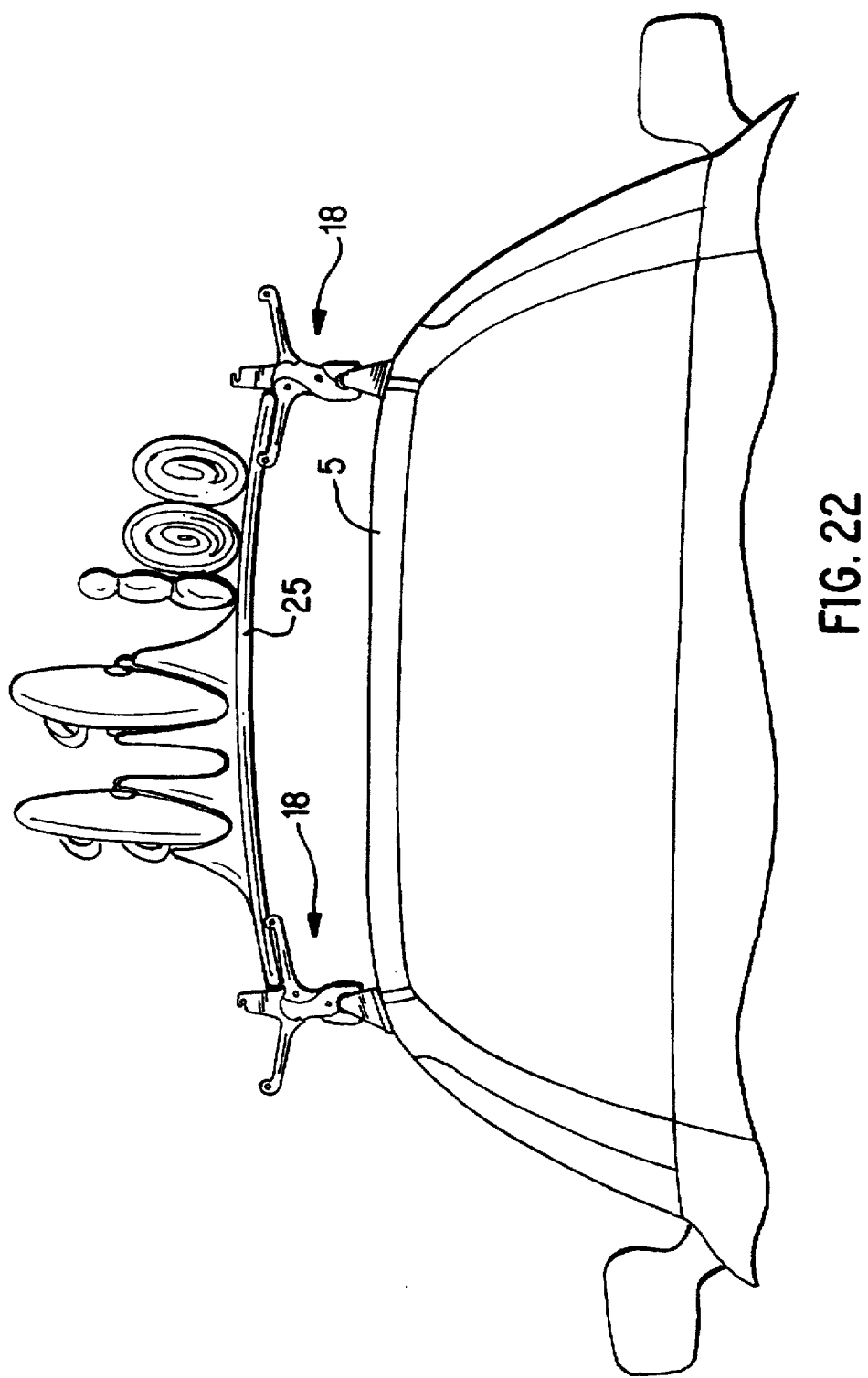
FIG. 22 shows a construction in which the load holders form a securing combination for a load carrier which extends over the roof of a vehicle.

In the case of the construction shown in FIG. 22 four load holders 18 are combined to form a securing combination for a load carrier arrangement 25 which extends over the surface of a vehicle roof as indicated at 5. Various loads such as for example a surfboard, kayak, ski, accessories and the like can be disposed on the load carrier arrangement 25. A securing combination of that kind can also be afforded by using the load holders 17 as illustrated for example in FIG. 1.

Figure 23:
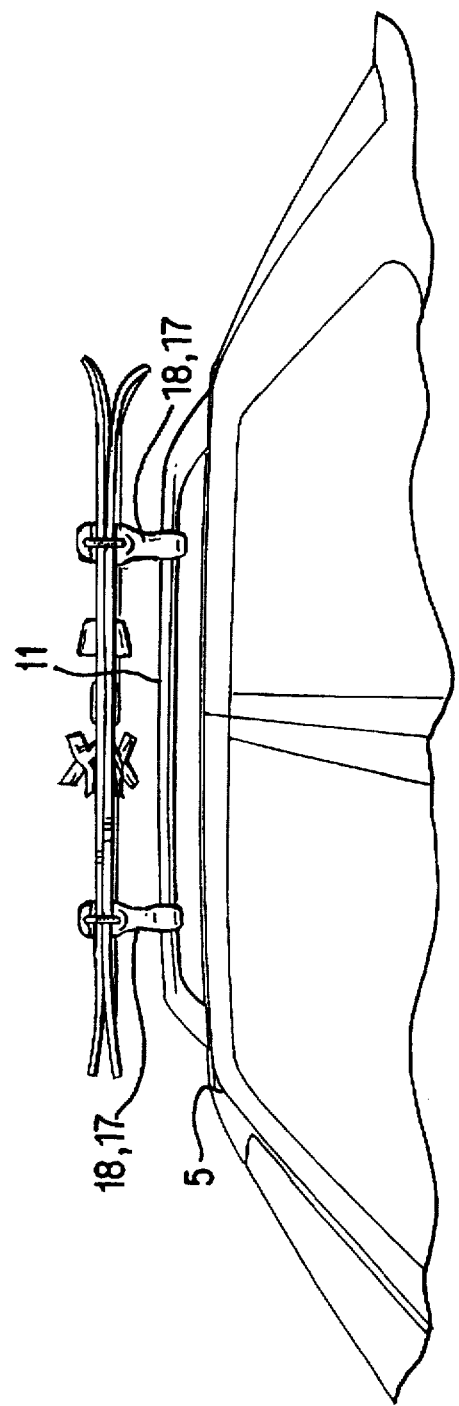

FIGS. 23 through 25 show an embodiment in the form of a ski holder, comprising load holders 17 or 18 which can be suitably fixed to the roof 5 of a motor vehicle by engaging on to a rail diagrammatically illustrated at 11.

It will be noted that the load holders 17, 18 are of such a configuration that the clamping jaws 3, 4 are held in their clamping position by the loads secured to the load holders. That is achieved by virtue of the positively locking connection within the assembly formed from the load and at least first and second load holders, and by virtue of the force applied by the weight of the load itself.

It will be appreciated that the above-described embodiments of the present invention have been set forth solely by way of example and illustration of the principles of the invention and that various other modifications and alterations may be made therein without thereby departing from the spirit and scope of the invention.

What is claimed is:

1. Apparatus for securing a load to a motor vehicle comprising:

at least first and second load holders adapted to be fixed to a vehicle body, load securing means provided on each of the holders for securing a load extending in a longitudinal direction of the vehicle, clamping means included in each of the load holders for securing a respective load holder to an intermediate carrier which, in use, is connected to the vehicle body, and first and second clamping jaws included in the clamping means for embracing a part of the intermediate carrier, the clamping jaws having a clamping opening which is matched to a profile of the intermediate carrier and which, in a clamping position, substantially embraces said profile and with a longitudinal extent, in its axial direction, which is substantially parallel to the longitudinal direction of the vehicle, wherein the load securing means are fixed to respective clamping jaws in such a way that a force produced by the weight of a load on the load securing means holds the clamping jaws in the clamping position.

2. Apparatus as set forth in claim 1 and further comprising connecting means for relatively movably connecting the clamping jaws together.

3. Apparatus as set forth in claim 2 wherein the connecting means comprises a pivot.

4. Apparatus as set forth in claim 3 wherein the pivot is arranged above the clamping opening in the clamping position.

5. Apparatus as set forth in claim 3 wherein the clamping jaws are scissor-like connected together by the pivot and wherein in the clamping position the clamping opening is disposed below the pivot and the load securing means are disposed above the pivot on the clamping jaws.

6. Apparatus as set forth in claim 5 and further comprising a clamping portion which is pivotably mounted on one of said clamping jaws and operable to lock the clamping jaws which are scissor-like connected together to each other in the clamping position.

7. Apparatus as set forth in claim 6 wherein the clamping portion includes a load securing means.

8. Apparatus as set forth in claim 1 wherein the load securing means are provided laterally on the clamping jaws.

9. Apparatus as set forth in claim 1 wherein the load securing means have support contact surfaces which extend approximately perpendicularly relative to a longitudinal central plane of at least one of the load holders in the clamping position.

10. Apparatus as set forth in claim 5 wherein the load securing means have support contact surfaces which extend slightly inwardly inclinedly relative to the longitudinal central plane of the load holder in the clamping position.

11. Apparatus as set forth in claim 1 and further comprising gripping means for fixing the load to the load securing means.

12. Apparatus as set forth in claim 11 and further comprising a locking loop means, pivotably mounted to one of the load securing means and which, in the locking position, extends over the load securing means, for locking the clamping jaws to each other to prevent movement, wherein the locking loop means and the load securing means define a frame configuration and the gripping means is arranged at least substantially diagonally in the frame configuration.

13. Apparatus as set forth in claim 1 and further comprising insert means on the clamping jaws for adaptation of the cross-section of the clamping opening to the intermediate carrier cross-section.

14. Apparatus as set forth in claim 1 wherein the intermediate carrier is a longitudinally extending roof rail means fitted on the vehicle body.

15. Apparatus as set forth in claim 1 wherein the intermediate carrier is a clamping shoe adapted to be fixed in a gap on the vehicle body.

16. Apparatus as set forth in claim 15 wherein the gap is formed by a rail arranged in sunk relationship in a vehicle roof.

17. Apparatus as set forth in claim 15 wherein the gap is formed between a trunk lid edge and a surrounding part of the vehicle body.

18. Apparatus as set forth in claim 1 wherein the load holders are formed as ski holders.

19. Apparatus as set forth in claim 1 wherein the load holders are formed as snowboard holders.

20. Apparatus as set forth in claim 1 wherein the load holders are formed as bicycle holders.

21. Apparatus as set forth in claim 1 wherein first, second, third and fourth load holders, forming a securing combination for a load carrier device extending over a bodywork surface, are provided.

22. Apparatus for securing a load to a motor vehicle comprising:
at least first and second load holders adapted to be fixed to a vehicle body,
load securing means provided on each of the holders for securing a load extending in a longitudinal direction of the vehicle,
clamping means included in each of the load holders for securing a respective load holder to an intermediate carrier which, in use, is connected to the vehicle body,
first and second clamping jaws included in the clamping means for embracing a part of the intermediate carrier, the clamping jaws having a clamping opening which is matched to a profile of the intermediate carrier and which, in a clamping position, substantially embraces said profile and with a longitudinal extent, in its axial direction, which is substantially parallel to the longitudinal direction of the vehicle, and
connecting means for relatively movably connecting the clamping jaws together and comprising a pivot,
wherein the load securing means are arranged in a plane between the pivot and the clamping opening.

23. Apparatus as set forth in claim 22 wherein the load securing means are fixed to respective clamping jaws.

24. Apparatus as set forth in claim 22 wherein the load securing means have support contact surfaces which extend approximately perpendicularly relative to a longitudinal central plane of at least one of the load holders in the clamping position.

25. Apparatus for securing a load to a motor vehicle comprising:
at least first and second load holders adapted to be fixed to a vehicle body,
load securing means provided on each of the holders for securing a load extending in a longitudinal direction of the vehicle,
clamping means included in each of the load holders for securing a respective load holder to an intermediate carrier which, in use, is connected to the vehicle body,
first and second clamping jaws included in the clamping means for embracing a part of the intermediate carrier, the clamping jaws having a clamping opening which is matched to a profile of the intermediate carrier and which, in a clamping position, substantially embraces said profile and with a longitudinal extent, in its axial direction, which is substantially parallel to the longitudinal direction of the vehicle,
connecting means for relatively movably connecting the clamping jaws together and comprising a pivot, and
a locking loop means, pivotably mounted to one of the load securing means and which, in a locking position, extends over the load securing means, for locking the clamping jaws to each other to prevent movement about the pivot.

26. Apparatus as set forth in claim 25 wherein the locking loop means is supported in the locking position at both outer ends of the load securing means, which ends are diametral in relation to a longitudinal central plane of one of the load holders and substantially in the longitudinal central plane on the one of the load holders.

27. Apparatus as set forth in claim 26 including means for movement of the locking loop means into its definitive locking position by a displacement which is directed transversely to said longitudinal central plane of the one of the load holders.

28. Apparatus as set forth in claim 25 wherein the load securing means have support contact surfaces which extend approximately perpendicularly relative to a longitudinal central plane of at least one of the load holders in the clamping position.

* * * * *